(12) United States Patent
Kim et al.

(10) Patent No.: US 12,347,404 B2
(45) Date of Patent: Jul. 1, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Jiman Kim, Suwon-si (KR); Jaesung Park, Suwon-si (KR); Seongwoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/084,058

(22) Filed: Dec. 19, 2022

(65) Prior Publication Data

US 2023/0206879 A1 Jun. 29, 2023

Related U.S. Application Data

(63) Continuation of application No. PCT/KR2022/014791, filed on Sep. 30, 2022.

(30) Foreign Application Priority Data

Dec. 24, 2021 (KR) .................. 10-2021-0187189
Jun. 10, 2022 (KR) .................. 10-2022-0070904

(51) Int. Cl.
*G09G 5/02* (2006.01)
*G09G 3/20* (2006.01)

(52) U.S. Cl.
CPC ............. *G09G 5/02* (2013.01); *G09G 3/2003* (2013.01); *G09G 2320/0666* (2013.01)

(58) Field of Classification Search
CPC .... G09G 5/02; G09G 5/06; G09G 2320/0666; G09G 2340/06; G09G 3/20;

(Continued)

(56) References Cited

U.S. PATENT DOCUMENTS 8,593,476 B2 11/2013 Demos
9,105,217 B2 8/2015 Demos
(Continued)

FOREIGN PATENT DOCUMENTS

CN 113362142 9/2021
JP 5908264 4/2016
(Continued)

OTHER PUBLICATIONS

Search Report dated Jan. 19, 2023 for International Application No. PCT/KR2022/014791.

(Continued)

*Primary Examiner* — Gordon G Liu
(74) *Attorney, Agent, or Firm* — Nixon & Vanderhye, P.C.

(57) ABSTRACT

An example electronic apparatus includes a display; a memory storing spectrum information of the display and color matching function (CMF) information related to the display; and a processor configured to, based on a test image being displayed through the display, obtain color measurement data based on color measurement of the test image, based on an image for converting into a non-fungible token (NFT) being selected and displayed through the display, obtain current setting information of the electronic apparatus, and obtain NFT by combining the color measurement data, current setting information of the electronic apparatus, spectrum information of the display, and CMF information related to the display with attribute information of the image.

14 Claims, 14 Drawing Sheets

(58) Field of Classification Search
CPC ..... G09G 2320/0626; G09G 2360/144; G09G 2360/16; G09G 5/006; G09G 2320/0276; G09G 2320/066; G09G 2370/042; G09G 2370/12; G09G 3/2003; G09T 11/001; G06F 2200/1614; G06F 2200/1637; G06F 3/1454; G06F 3/1432; G06T 11/001; G06T 11/20; G06T 11/40; G06T 11/60; G06T 11/00; G06T 5/40; G06T 2207/10024; G06T 2207/20081; G06T 2207/20084
USPC .......................................................... 345/589
See application file for complete search history.

(56) References Cited

U.S. PATENT DOCUMENTS

| | | | |
|---|---|---|---|
| 9,635,377 | B2 | 4/2017 | Kim et al. |
| 9,773,471 | B2 | 9/2017 | Demos |
| 10,439,868 | B2 | 10/2019 | Lim et al. |
| 11,030,972 | B2 | 6/2021 | Kwon et al. |
| 11,182,467 | B1 | 11/2021 | Medina |
| 2004/0263634 | A1 | 12/2004 | Kiuchi |
| 2005/0099431 | A1 | 5/2005 | Herbert et al. |
| 2005/0253866 | A1 | 11/2005 | Kim et al. |
| 2009/0201309 | A1 | 8/2009 | Demos |
| 2012/0268437 | A1* | 10/2012 | Lee .......................... G09G 3/20 345/207 |
| 2014/0092120 | A1 | 4/2014 | Demos |
| 2015/0317928 | A1* | 11/2015 | Safaee-Rad ............ G09G 3/006 345/593 |
| 2016/0189672 | A1 | 6/2016 | Demos |
| 2016/0254950 | A1 | 9/2016 | Lim et al. |
| 2020/0413099 | A1 | 12/2020 | Su et al. |
| 2021/0398095 | A1 | 12/2021 | Mallett et al. |
| 2022/0050982 | A1* | 2/2022 | Spivack ........... G06K 19/06037 |
| 2022/0069996 | A1* | 3/2022 | Xue ....................... H04L 9/3297 |
| 2023/0109574 | A1* | 4/2023 | Vosseller ................ G06F 21/64 705/317 |

FOREIGN PATENT DOCUMENTS

| | | |
|---|---|---|
| KR | 10-2010-0126382 | 12/2010 |
| KR | 10-2016-0104951 | 9/2016 |
| KR | 10-2019-0036656 | 4/2019 |
| KR | 10-2176398 | 11/2020 |
| KR | 10-2021-0059589 | 5/2021 |

OTHER PUBLICATIONS

Written Opinion dated Jan. 19, 2023 for International Application No. PCT/KR2022/014791.
OpenSea NFT marketplace application—OpenSea Creatures—Starter ERC721, ERC1155, and factory contracts, Jun. 1, 2018, 3 pages.
High Dynamic Range Metadata for Apple Devices, May 31, 2019, 10 pages.
HDR10+ System Whitepaper, Sep. 4, 2019, 14 pages.
Dolby Vision, An Introduction to Dolby Vision, Jan. 2014, 5 pages.
Extended Search Report dated Aug. 1, 2024 in European Patent Application No. 22911534.0.
Reinhard, Erik et al., "Color Imaging—Chapter 7 Colorimetry," Color Imaging: Fundamentals and Applications, 2008, pp. 363-403.
Communication pursuant to Articulate 94(3) EPC dated Apr. 30, 2025 in European Application No. 22911534.0.

* cited by examiner

ELECTRONIC APPARATUS AND CONTROLLING METHOD THEREOF

CROSS-REFERENCE TO RELATED APPLICATIONS

This application is a continuation of PCT/KR2022/014791, filed on Sep. 30, 2022, at the Korean Intellectual Property Receiving Office and claims priority under 35 U.S.C. § 119 to Korean Patent Application No. 10-2021-0187189, filed on Dec. 24, 2021 at the Korean Intellectual Property Office and to Korean Patent Application No. 10-2022-0070904, filed on Jun. 10, 2022 at the Korean Intellectual Property Office, the disclosures of each which are incorporated by reference herein in their entireties.

BACKGROUND

Field

This disclosure relates to an electronic apparatus for generating a non-fungible token (NFT), an electronic apparatus for adjusting color using the NFT, and a controlling method thereof.

Description of Related Art

A block chain is a data forgery prevention technology based on distributed computing technology. The block chain technology may record a change result of data to be managed by storing the data to be managed in the distributed data storage environment, which is a block, thereby preventing forgery of data. Due to the feature of this block chain, the interest of cryptocurrency using block chain technology has recently increased.

In particular, when a transaction is generated in a non-fungible token (NFT) generated by recording a digital asset such as an image and unique asset information on a digital asset in a block, transaction information such as seller and purchaser, trading date and sale price is recorded. NFTs have been in the spotlight as a new investment type that may function as cryptocurrency that verifies an owner of the digital asset.

The NFT may include attribute information about a digital asset such as an image in addition to unique asset information, and the attribute information of the NFT, based on a feature of the NFT in which a value is added to a digital asset such as an image, may include information about an element that allows a user to feel an aesthetic feeling from a digital asset.

The attribute information of a conventional NFT typically includes information related to the visual characteristics of the digital asset itself. In addition to the visual characteristics of the digital asset itself, the characteristics of the electronic apparatus on which the NFT image is displayed may also affect the aesthetic feeling obtained from the NFT image.

For example, if the spectrum information of the display included in the electronic apparatus of the NFT manufacturer and the spectrum information of the display included in the electronic apparatus of the NFT purchaser are different, the aesthetic feeling felt through the NFT image displayed on each of the apparatuses may be different. Here, the aesthetic feeling may be determined by characteristics such as the color or brightness of the NFT image, but is not limited thereto.

As described above, differences in aesthetic feeling due to differences in spectrum information of the display included in each of the two electronic apparatuses is called metamerism, and there has been a continuous need for a method that allows the creation intention of the NFT manufacturer to be delivered to the NFT purchaser by unifying the aesthetic feeling obtained through each of the NFT image displayed on the electronic apparatus of the NFT manufacturer and the NFT image displayed on the electronic apparatus of the NFT purchaser.

SUMMARY

An electronic apparatus according to an embodiment includes a display; a memory configured to store spectrum information of the display and color matching function (CMF) information related to the display; and a processor configured to, based on a test image being displayed through the display, obtain color measurement data based on color measurement of the test image, based on an image for converting into a non-fungible token (NFT) being selected and displayed through the display, obtain current setting information of the electronic apparatus, and obtain an NFT by combining the color measurement data, current setting information of the electronic apparatus, spectrum information of the display, and CMF information related to the display with attribute information of the image.

In an embodiment, the setting information of the electronic apparatus comprises at least one of gamut information, brightness information, or gamma information.

In an embodiment, the CMF information related to the display comprises at least one of recommended CMF information corresponding to the display or CMF information used for obtaining the color measurement data.

In an embodiment, the processor is further configured to provide a guide user interface for guiding a measurement environment related to color measurement of the test image through the display.

An electronic apparatus according to an embodiment includes a display; a memory configured to store first spectrum information of the display and first color matching function (CMF) information related to the display; and a processor configured to, based on an NFT image provided from an NFT management server being displayed through the display, change the setting information of the electronic apparatus based on the setting information of an external device in which the NFT is manufactured, based on a test image being displayed through the display, obtain first color measurement data based on a color measurement of the test image, obtain color calibration information based on the first color measurement data, the first spectrum information, the first CMF information, and second color measurement data, second spectrum information, and second CMF information of the external device, and adjust a color of the NFT image displayed through the display based on the obtained color calibration information.

In an embodiment, the first CMF information comprises recommended CMF information of the electronic apparatus, and the processor is further configured to: based on the first spectrum information, obtain first color information in which the first color measurement data is provided according to the first CMF information, based on the second spectrum information, obtain second color information in which the second color measurement data is provided according to the first CMF information, and adjust color of the NFT image by comparing the first color information and the second color information.

In an embodiment, the first CMF information comprises first recommended CMF information and first measurement CMF information used in obtaining the first color measurement data, and the second CMF information comprises second recommended CMF information and second measurement CMF information used in obtaining the second color measurement data, and the processor is further configured to: identify one of the first recommended CMF information and the second recommended CMF information as reference CMF information, obtain first color calibration information based on the first color measurement data, the first spectrum information, the reference CMF information, and the first measurement CMF information, obtain the first color information based on the first color calibration information and the first color measurement data, obtain second color calibration information based on the second color measurement data, the second spectrum information, the reference CMF information, and the second measurement CMF information, obtain the second color information based on the second color calibration information and the second color measurement data, and adjust color of the NFT image by comparing the first color information and the second color information.

In an embodiment, the processor is further configured to: display a UI screen comprising a plurality of NFT images through the display, and individually adjust color of the plurality of NFT images based on attribute information corresponding to each of the plurality of NFT images.

In an embodiment, the processor is further configured to display a guide UI, through the display, comprising recommended color adjustment information to adjust color of the NFT image based on the obtained color calibration information.

In an embodiment, the processor is further configured to adjust brightness of the NFT image by comparing the first color information and the second color information.

A controlling method of an electronic apparatus according to an embodiment may include, based on a test image being displayed through the display, obtaining color measurement data based on color measurement of the test image, based on an image for converting into a non-fungible token (NFT) being selected and displayed through the display, obtaining current setting information of the electronic apparatus, and obtaining an NFT by combining the color measurement data, current setting information of the electronic apparatus, spectrum information of the display, and CMF information related to the display with attribute information of the image.

The controlling method of an electronic apparatus according to an embodiment may include, based on an NFT image provided from an NFT management server being displayed through the display, changing the setting information of the electronic apparatus based on the setting information of an external device in which the NFT is manufactured, based on a test image being displayed through the display, obtaining first color measurement data based on a color measurement of the test image, obtaining color calibration information based on the first color measurement data, first spectrum information, first CMF information, and second color measurement data, second spectrum information, and second CMF information of the external device, and adjusting a color of the NFT image displayed through the display based on the obtained color calibration information.

In an embodiment, the first CMF information comprises recommended CMF information of the electronic apparatus, and the adjusting color of the NFT image comprises: based on the first spectrum information, obtaining first color information in which the first color measurement data is provided according to the first CMF information; based on the second spectrum information, obtaining second color information in which the second color measurement data is provided according to the first CMF information; and adjusting color of the NFT image by comparing the first color information and the second color information.

In an embodiment, the first CMF information comprises first recommended CMF information and first measurement CMF information used in obtaining the first color measurement data, and the second CMF information comprises second recommended CMF information and second measurement CMF information used in obtaining the second color measurement data, the obtaining the color calibration information comprises: identifying one of the first recommended CMF information and the second recommended CMF information as reference CMF information; obtaining first color calibration information based on the first color measurement data, the first spectrum information, the reference CMF information, and the first measurement CMF information; and obtaining second color calibration information on the basis of based on the second color measurement data, the second spectrum information, the reference CMF information, and the second measurement CMF information, and the adjusting color of the NFT image comprises: obtaining the first color information based on the first color calibration information and the first color measurement data; obtaining the second color information based on the second color calibration information and the second color measurement data; and adjusting color of the NFT image by comparing the first color information and the second color information.

In an embodiment, the adjusting color of the NFT image comprises: displaying a UI screen comprising a plurality of NFT images through the display; and individually adjusting color of the plurality of NFT images based on attribute information corresponding to each of the plurality of NFT images.

In an embodiment, the adjusting color of the NFT image comprises: providing a guide UI comprising recommended color adjustment information to adjust color of the NFT image based on the obtained color calibration information.

A non-transitory computer readable medium according to an embodiment stores computer instructions which, when executed by a processor of an electronic apparatus cause the electronic apparatus to perform operations including, based on a test image being displayed through the display, obtaining color measurement data based on color measurement of the test image, based on an image for converting into a non-fungible token (NFT) being selected and displayed through the display, obtaining current setting information of the electronic apparatus, and obtaining an NFT by combining the color measurement data, current setting information of the electronic apparatus, spectrum information of the display, and CMF information related to the display with attribute information of the image.

A non-transitory computer readable medium according to an embodiment stores computer instructions which, when executed by a processor of an electronic apparatus, cause the electronic apparatus to perform operations including, based on an NFT image provided from the NFT management server being displayed through the display, changing the setting information of the electronic apparatus based on the setting information of an external device in which the NFT is manufactured, based on a test image being displayed through the display, obtaining first color measurement data based on a color measurement of the test image, obtaining color calibration information based on the first color measurement data, first spectrum information, first CMF information, and second color measurement data, second spectrum information, and second CMF information of the external device, and adjusting a color of the NFT image displayed through the display based on the obtained color calibration information.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
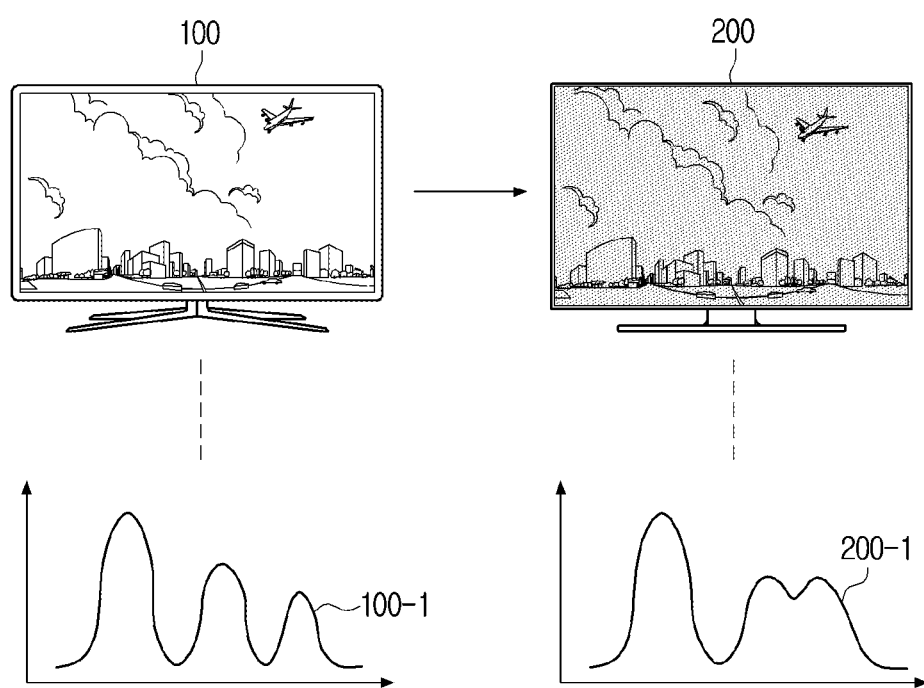
FIG. 1 is a diagram illustrating metamerism.

The example embodiments of the present disclosure may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, terms used in this disclosure should be defined based on the meaning of a term, not a simple name of the term, and the contents throughout this disclosure.

It is to be understood that terms such as "comprise" or "consist of" are used herein to designate a presence of a characteristic, number, step, operation, element, component, or a combination thereof, and not to preclude a presence of additional characteristics.

Expressions such as "at least one of A or B" and "at least one of A and B" should be understood to represent "A," "B," or "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or any combination of hardware and software. Further, except for when each of a plurality of "modules," "units," "parts," and the like needs to be realized in an individual hardware, the components may be integrated in at least one module or chip and be realized in at least one processor (not shown).

FIG. 1 is a diagram illustrating metamerism.

Referring to FIG. 1, each of the first electronic apparatus 100 and the second electronic apparatus 200 may be implemented with various types of electronic apparatuses such as TV, smartphones, tablet PCs, mobile phones, video telephones, electronic book readers, desktop personal computers (PCs), laptop PCs, netbook computers, workstations, servers, a portable digital assistant (PDA), a portable multimedia player (PMP), an MP3 player, a medical device, a camera, or a wearable device, but is not limited thereto. In this disclosure, for convenience of description, each of the first electronic apparatus 100 and the second electronic apparatus 200 is implemented as a TV.

Each of the first electronic apparatus 100 and the second electronic apparatus 200 may include a display, and may have different spectrum information depending on the characteristics of the panel constituting the display of each apparatus. For example, the first electronic apparatus 100 may have first spectrum information 100-1 and the second electronic apparatus 200 including a display panel different from a display panel included in the first electronic apparatus 100 may have second spectrum information 200-1.

In a case in which the same image is displayed through each of the first electronic apparatus 100 and the second electronic apparatus 200, a phenomenon that a user feels a color from the same image is different due to the difference in the spectrum information of each device is referred to as metamerism.

The aesthetic feeling felt by the user of the second electronic apparatus 200 when purchasing the NFT manufactured through the first electronic apparatus 100 and seeing the NFT image through the second electronic apparatus 200 may be different from the aesthetic feeling of the NFT manufacturer when seeing the NFT image through the first electronic apparatus 100.

The aesthetic feeling delivered through the NFT image is included in the efficacy to be earned by the NFT purchaser, and even if the NFT image is displayed on the electronic apparatus other than the electronic apparatus used by the manufacturer, once the image may provide an aesthetic feeling similar to a feeling in which the NFT image is displayed on the electronic apparatus used by the manufacturer, satisfaction of the NFT purchaser by purchasing the NFT may be further increased.

For this purpose, the first electronic apparatus 100 used to generate the NFT by the manufacturer may combine attribute information based on various types of data into metadata of the NFT to generate the NFT, and the second electronic apparatus 200 used by the purchaser to display the NFT image may adjust the setting of the second electronic apparatus 200 based on the attribute information included in the NFT to adjust, e.g., color of the NFT image. As a result, even when the NFT image is displayed on the second electronic apparatus 200, a similar aesthetic feeling as a feeling in a case in which the NFT image is displayed on the first electronic apparatus 100 may be provided.

Hereinafter, various embodiments of adjusting color of the NFT image based on color measurement data, setting information, spectrum information, and CMF information related to the display are combined with the attribute information of the image to generate the NFT, and more specifically, various embodiments for adjusting color of the NFT image based on the attribute information of the NFT will be described in detail.

Figure 2:
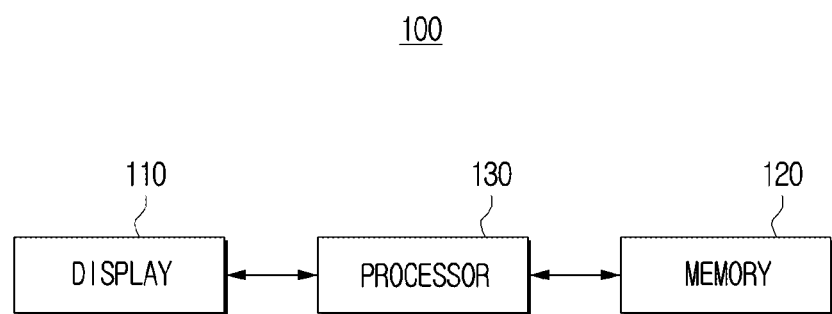
FIG. 2 is a block diagram illustrating a configuration of an example electronic apparatus of an NFT manufacturer according to various embodiments.

FIG. 2 is a block diagram illustrating a configuration of an example electronic apparatus of an NFT manufacturer according to various embodiments.

Referring to FIG. 2, the electronic apparatus of the NFT manufacturer (hereinafter, first electronic apparatus 100) may include a display 110, a memory 120, and a processor 130.

The display 110 is configured to display an image provided to a user by the first electronic apparatus 100. The display 110 may be implemented as various types of displays such as, for example, a liquid crystal display (LCD), organic light emitting diodes (OLED) display, quantum dot light-emitting diodes (QLED), a plasma display panel (PDP), or the like. The display 110 may be implemented as a display including a micro light emitting diode (LED) including a micro LED having a size of 100 µm or less.

In the display 110, a driving circuit may be implemented using a thin film transistor (TFT), a low temperature poly silicon (LTPS) TFT, or an organic TFT (OTFT), and a backlight may be included. Further, the display 110 may be implemented as a flexible display, a three-dimensional (3D) display, or the like.

The display 110 includes a plurality of pixels, each pixel including a plurality of sub-pixels. For example, each pixel may include three sub-pixels corresponding to a plurality of colors of light, e.g., red, green, and blue light (R, G, B). However, the disclosure is not limited thereto, and as such, according to another embodiment, cyan, magenta, yellow, black, or other sub-pixels may be included alternatively or in addition to the red, green, and blue sub-pixels. The display 110 according to an example may include an LED panel in which each of the plurality of pixels may include an LED pixel.

The memory 120 may store data required for various embodiments of the disclosure. The memory 120 may be implemented as a memory embedded within the first electronic apparatus 100 or a memory detachable from the first electronic apparatus 100 according to the usage of data storage. For example, data for driving the first electronic apparatus 100 may be stored in the memory embedded within the first electronic apparatus 100, and data for extended function of the first electronic apparatus 100 may be stored in the memory detachable from the first electronic apparatus 100. A memory embedded in the first electronic apparatus 100 may be implemented as at least one of a volatile memory such as a dynamic random access memory (DRAM), a static random access memory (SRAM), a synchronous dynamic random access memory (SDRAM), or a non-volatile memory (e.g., one time programmable ROM (OTPROM), programmable ROM (PROM), erasable and programmable ROM (EPROM), EEPROM, mask ROM, flash ROM, a flash memory (e.g., NAND flash or NOR flash), a hard disk drive (HDD), a solid state drive (SSD), or the like). A memory detachably mounted to the first electronic apparatus 100 may be implemented as a memory card (e.g., a compact flash (CF), a secure digital (SD), micro secure digital (micro-SD), a mini secure digital (mini-SD), an extreme digital (xD), a multi-media card (MMC), etc.), an external memory (e.g., a universal serial bus (USB) memory, or the like) connectable to the USB port, or the like.

The memory 120 may store spectrum information of the display 110 and color matching function (CMF) information related to the display 110. The CMF is, for example, a function that includes a sensitivity that is responsive to each of the reference colors such as R, G, and B, i.e., weight information based on the sensitivity for each wavelength of visible light. Typical CMF types include a function of CIE 1931, CIE 1964, Judd, and Vos.

The spectrum information of the display 110 is, for example, based on the type of the panel constituting the display 110, and the spectrum information of the display 110 may be stored in the memory 120 by the manufacturer based on measurement value(s) obtained when the first electronic apparatus 100 is manufactured. However, the disclosure is not limited in this respect.

The CMF information related to the display 110 may include at least one of CMF information used in the process of obtaining color measurement data based on recommended CMF information corresponding to the display 110 or a test image displayed on the display 110 through a measurement device, but the disclosure is not limited in this respect.

The processor 130 (e.g., including processing circuitry) controls the overall operation of the first electronic apparatus 100. The processor 130 may be connected to each component of the first electronic apparatus 100 to control the operation of the first electronic apparatus 100 in general. For example, the processor 130 may be connected to the display 110 and memory 120 to control the operation of the first electronic apparatus 100.

According to an embodiment, the processor 130 may be referred to by various names such as a digital signal processor (DSP), a microprocessor, a central processing unit (CPU), a micro controller unit (MCU), a micro processing unit (MPU), a neural processing unit (NPU), a controller, and an application processor (AP), but will be referred to as the processor 130 herein.

The processor 130 may be implemented as a system on chip (SoC) type or a large scale integration (LSI) type, or in a field programmable gate array (FPGA) type. The processor 130 may include volatile memory such as SRAM.

The processor 130 according to an embodiment of the disclosure may obtain color measurement data based on the color measurement of a test image when the test image is displayed through the display 110. The test image may be an image having a predetermined single color, but is not limited thereto.

According to an example, the color measurement may be performed based on a separate measurement device, not the first electronic apparatus 100. The processor 130 may provide a guide user interface (UI) for guiding a measurement environment associated with a color measurement of the test image through the display 110.

The processor 130 may obtain the current setting information of the first electronic apparatus 100 if an image is selected for converting into an NFT and displayed through the display 110. The setting information of the first electronic apparatus 100 may include at least one of color gamut information, brightness information, or gamma information, but is not limited thereto.

The processor 130 may combine the color measurement data, the current setting information of the first electronic apparatus 100, the spectrum information of the display 110, and the CMF information associated with the display 110 with attribute information of an image to obtain the NFT.

Figure 3:
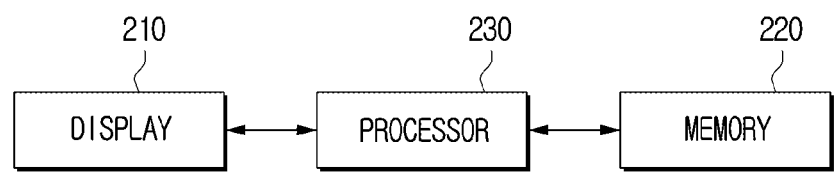
FIG. 3 is a block diagram illustrating a configuration of an example electronic apparatus of an NFT purchaser according to various embodiments.

FIG. 3 is a block diagram illustrating a configuration of an example electronic apparatus of an NFT purchaser according to various embodiments.

Referring to FIG. 3, the electronic apparatus (hereinafter, second electronic apparatus 200) of the NFT purchaser may include a display 210, a memory 220, and a processor 230.

The display 210 is configured to display an image provided to a user by the second electronic apparatus 200. The display 210 may be implemented as various types of displays such as, for example, a liquid crystal display (LCD), organic light emitting diodes (OLED) display, quantum dot light-emitting diodes (QLED), a plasma display panel (PDP), or the like. The display 210 may be implemented as a display including a micro light emitting diode (LED) including a micro LED having a size of 100 μm or less.

In the display 210, a driving circuit may be implemented using a thin film transistor (TFT), a low temperature poly silicon (LTPS) TFT, or an organic TFT (OTFT), and a backlight may be included. Further, the display 210 may be implemented as a flexible display, a three-dimensional (3D) display, or the like.

The display 210 includes a plurality of pixels, each pixel including a plurality of sub-pixels. For example, each pixel may include three sub-pixels corresponding to a plurality of colors of light, e.g., red, green, and blue light (R, G, B). However, the disclosure is not limited thereto, and as such, according to another embodiment, cyan, magenta, yellow, black, or other sub-pixels may be included alternatively or in addition to the red, green, and blue sub-pixels. The display 210 according to an example may include an LED panel in which each of a plurality of pixels may include an LED pixel.

The memory 220 may store data required for various embodiments of the disclosure. The memory 220 may be implemented as a memory embedded within the second electronic apparatus 200 or a memory detachable from the second electronic apparatus 200 according to the usage of data storage. For example, data for driving the second electronic apparatus 200 may be stored in the memory embedded within the second electronic apparatus 200, and the data for extended function of the second electronic apparatus 200 may be stored in the memory detachable from the second electronic apparatus 200. A memory embedded in the second electronic apparatus 200 may be implemented as at least one of a volatile memory such as a dynamic random access memory (DRAM), a static random access memory (SRAM), a synchronous dynamic random access memory (SDRAM), or a non-volatile memory (e.g., one time programmable ROM (OTPROM), programmable ROM (PROM), erasable and programmable ROM (EPROM), EEPROM, mask ROM, flash ROM, a flash memory (e.g., NAND flash or NOR flash), a hard disk drive (HDD), a solid state drive (SSD), or the like). A memory detachably mounted to the second electronic apparatus 200 may be implemented as a memory card (e.g., a compact flash (CF), a secure digital (SD), micro secure digital (micro-SD), a mini secure digital (mini-SD), an extreme digital (xD), a multi-media card (MMC), etc.), an external memory (e.g., a universal serial bus (USB) memory, or the like) connectable to the USB port, or the like.

The memory 220 according to one example may store first spectrum information of the display 210 and first color matching function (CMF) information associated with the display 210. The first spectrum information of the display 210 is information based on the type of panels constituting the display 210, and, for example, the manufacturer of the second electronic apparatus 200 may store the spectrum information of the display 210 in the memory 220 based on measurements made at the time of manufacture of the apparatus 200, but the disclosure is not limited in this respect.

The first CMF information associated with display 210 may include, but is not limited to, at least one of first recommended CMF information corresponding to display 210 or first measurement CMF information used in the process of obtaining color measurement data based on a test image displayed on display 210 via a measurement device.

The processor 230 (e.g., including processing circuitry) controls the overall operation of the second electronic apparatus 200. The processor 230 may be connected to each component of the second electronic apparatus 200 to control the operation of the second electronic apparatus 200 in general. For example, the processor 230 may be connected to the display 210 and memory 220 to control the operation of the second electronic apparatus 200.

According to an embodiment, the processor 230 may be referred to by various names such as a digital signal processor (DSP), a microprocessor, a central processing unit (CPU), a micro controller unit (MCU), a micro processing unit (MPU), a neural processing unit (NPU), a controller, and an application processor (AP), but will be referred to as the processor 230 herein.

The processor 230 may be implemented as a system on chip (SoC) type or a large scale integration (LSI) type, or in a field programmable gate array (FPGA) type. The processor 230 may include volatile memory such as SRAM.

The processor 230 according to one embodiment of the disclosure may change the setting information of the second electronic apparatus 200 based on setting information of the external device by which the NFT was manufactured when an NFT image provided from an NFT management server is displayed through the display 210. Herein, the external device may be, but is not limited to, the first electronic apparatus 100 described in FIG. 2.

In an embodiment the processor 230 may change the setting(s) of the second electronic apparatus 200 to be the same as the setting(s) of the external device based on the setting information of the external device included in the attribute information of the NFT. For example, the processor 230 may change at least one of the color gamut, brightness, or gamma values of the second electronic apparatus 200 to be the same as the setting of the external device.

In an embodiment, processor 230 may obtain first color measurement data based on color measurement of a test image when the test image is displayed through the display 210. The processor 230 may obtain color calibration information based on first color measurement data, first spectrum information and first CMF information, and second color measurement data, second spectrum information and second CMF information of an external device. The color calibration information may be, but is not limited to, information used for conversion between various types of CMF information involved in the operation of processor 230 (e.g., matrix data).

In an embodiment, the processor 230 may adjust the color of the NFT image displayed through the display 210 based on the color calibration information obtained. As a result, the second electronic apparatus 200 is capable of displaying an NFT image that may provide the same aesthetic feeling as the aesthetic feeling obtained in the NFT image displayed on the external device used in the NFT manufacturing.

In an embodiment, the first CMF information may include recommended CMF information of the second electronic apparatus 200. The processor 230 may obtain first color information in which first color measurement data is provided in accordance with the first CMF information based on the first spectrum information, and second color information in which the second color measurement data is provided in accordance with the first CMF information based on the second spectrum information of the external device. The processor 230 may adjust the color of the NFT image by comparing the first color information and the second color information.

In an embodiment, the processor 230 need not obtain the first color information and the second color information based on only the first CMF information. For example, the processor 230 may identify any one of the first CMF information or the second CMF information as reference CMF information, obtain first color information and second color information in which the first color measurement data and the second color measurement data are provided according to the reference CMF information, and compare the obtained first color information and the second color information to adjust the color of the NFT image.

In an embodiment, the first CMF information includes the first recommended CMF information and the first measurement CMF information used in obtaining the first color measurement data, and the second CMF information corresponding to the external device may include the second recommended CMF information and the second measured CMF information used in obtaining the second color measurement data. The processor 230 may identify any one of the first recommended CMF information and the second recommended CMF information as reference CMF information.

In an embodiment, the processor 230 may obtain first color calibration information based on first color measurement data, first spectrum information, reference CMF information, and first measurement CMF information, and obtain first color information based on first color calibration information and first color measurement data. The processor 230 may obtain second color calibration information based on the second color measurement data, the second spectrum information, the reference CMF information, and the second measurement CMF information, and may obtain the second color information based on the second color calibration information and the second color measurement data.

In an embodiment, the processor 230 may adjust the color of the NFT image by comparing the first color information and the second color information. As described above, the processor 230 may identify either the first CMF information or the second CMF information as reference CMF information, but the disclosure is not limited in this respect, and the processor 230 may, for example, identify the third CMF information predetermined by the manufacturer of the second electronic apparatus 200 as reference CMF information.

In an embodiment, the processor 230 may display a UI screen including a plurality of NFT images through the display 210 and adjust the color of the plurality of NFT images individually based on the attributes of each of the plurality of NFT images.

In an embodiment, the processor 230 may also provide a guide UI including recommended color calibration information for adjusting the color of the NFT image based on the obtained color calibration information through the display 210.

In an embodiment, the processor 230 may adjust brightness of the NFT image by comparing the first color information and the second color information.

Figure 4:
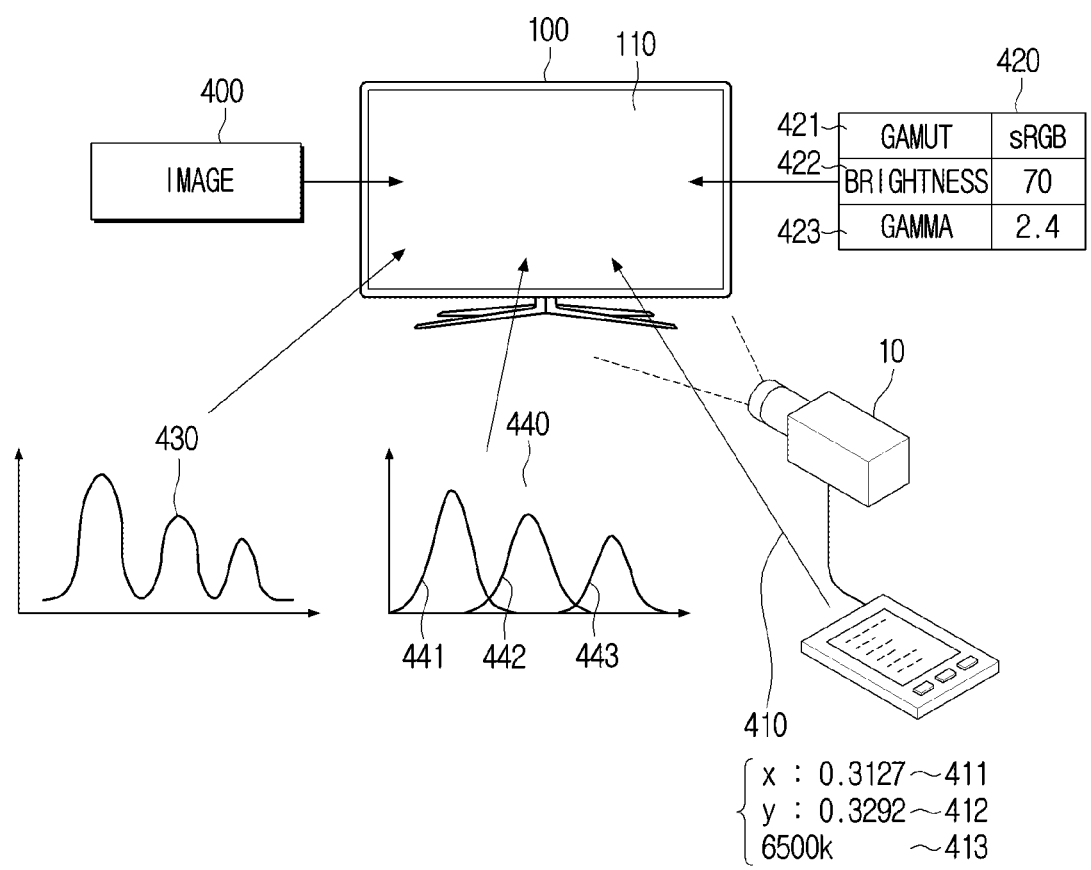
FIG. 4 is a diagram illustrating an example NFT generating process according to various embodiments.

FIG. 4 is a diagram illustrating an example NFT generating process according to various embodiments.

According to FIG. 4, the first electronic apparatus 100 may combine attribute information with image 400 to generate an NFT. The processor 130 may display a test image on the display 110 and obtain color measurement data based on color measurement of the displayed test image. In this process, the processor 130 may utilize the color measurement data 410 obtained from the measurement apparatus 10. In an embodiment, the color measurement data 410 may be represented by an x value 411, a y value 412 and a color temperature 413 based on two-axis coordinates, but may also be represented by X, Y, Z values based on three-axis coordinates.

The processor 130 may obtain current setting information 420 of the first electronic apparatus 100 when the NFT image 400 is selected and displayed through the display 110. The current setting information 420 may include, for example, gamut information 421 indicating that the color gamut of the first electronic apparatus 100 is sRGB, brightness information 422 indicating the brightness is 70, and gamma information 423 indicating the gamma value is 2.4, respectively.

The processor 130 may combine spectrum information 430 of the display 110 and CMF information 440 associated with the display 110 with attribute information of image 400 to obtain an NFT. The CMF information 440 according to one example may include, but is not limited to, information 441 indicating sensitivity with respect to the R value, information 442 indicating sensitivity with respect to the G value, and information 443 indicating sensitivity with respect to the B value.

Figure 5:
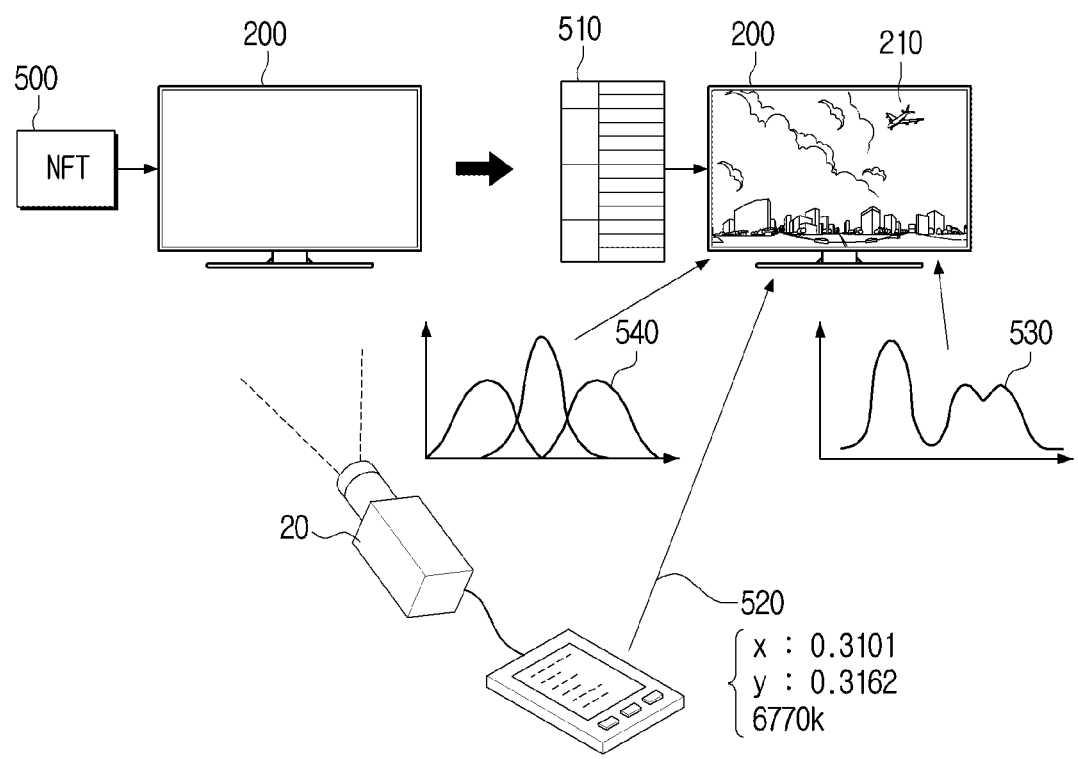
FIG. 5 is a diagram illustrating an example NFT purchasing process according to various embodiments.

FIG. 5 is a diagram illustrating an example NFT purchasing process according to various embodiments.

Referring to FIG. 5, when a user purchases an NFT 500 generated by an external device through a management server, the processor 230 may obtain attribute information 510 of the NFT 500 and various types of information associated with the second electronic apparatus 200.

For example, when the NFT 500 is purchased by a user of the second electronic apparatus 200, the processor 230 may display the NFT image through the display 210 and change the settings of the second electronic apparatus 200 based on the setting information of the external device included in the attribute information 510 of the NFT 500.

The processor 230 may obtain first color measurement data 520 obtained through the measurement apparatus 20, first spectrum information 530 of the display 210, and first CMF information 540 associated with the display 210.

The processor 230 may adjust the color of the NFT image based on the obtained first color measurement data 520, the first spectrum information 530, and the first CMF information 540 and information about an external device included in the attribute information 510 of the NFT 500.

Figure 6:
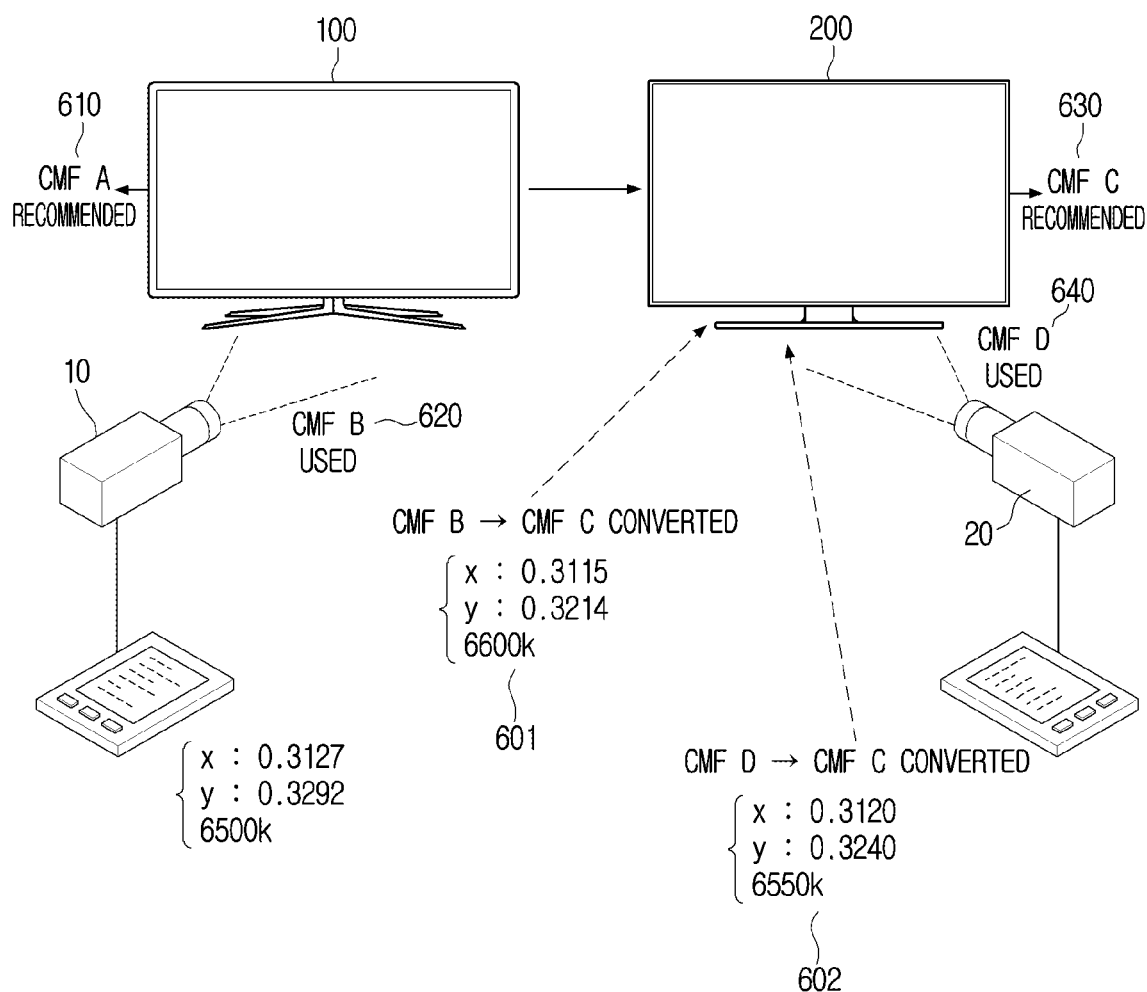
FIG. 6 is a diagram illustrating an example CMF converting process according to various embodiments.

FIG. 6 is a diagram illustrating an example CMF converting process according to various embodiments.

Referring to FIG. 6, the first electronic apparatus 100 may store recommended CMF information 610 and CMF information 620 used for color measurement of the measurement device 10. The recommended CMF information 610 is information stored by the manufacturer of the first electronic apparatus 100, which may be, but is not limited to, CMF information for use such that the color of the image displayed through the first electronic apparatus 100 resembles the reference color set by the manufacturer.

When a user of the second electronic apparatus 200 purchases an NFT generated by the first electronic apparatus 100, the second electronic apparatus 200 may perform CMF transformation based on recommended CMF information 630 for the second electronic apparatus 200 and CMF information 640 used for color measurement of the measurement device 20.

For example, the second electronic apparatus 200 may identify CMF C as a reference CMF based on the recommended CMF information 630 of the second electronic apparatus 200, and obtain the first color information and the second color information by assuming that the color measurement results of the first electronic apparatus 100 and the color measurement results of the second electronic apparatus 200 are provided through each of the first electronic apparatus 100 and the second electronic apparatus 200 according to CMF C, which is the reference CMF.

The second electronic apparatus 200 may convert the color measurement data of the second electronic apparatus 200 obtained using CMF D to obtain the first color information 602. The second electronic apparatus 200 may convert the color measurement data of the first electronic apparatus 100 obtained using CMF B to obtain the second color information 601.

The second electronic apparatus 200 may adjust the color of the NFT image by comparing the first color information 602 and the second color information 601. For example, the second electronic apparatus 200 may adjust the color of the NFT image by changing the settings of the apparatus 200 so that the NFT image displayed through the second electronic apparatus 200 has a color similar to the second color information 601 based on the difference between the first color information 602 and the second color information 601.

Figure 7:
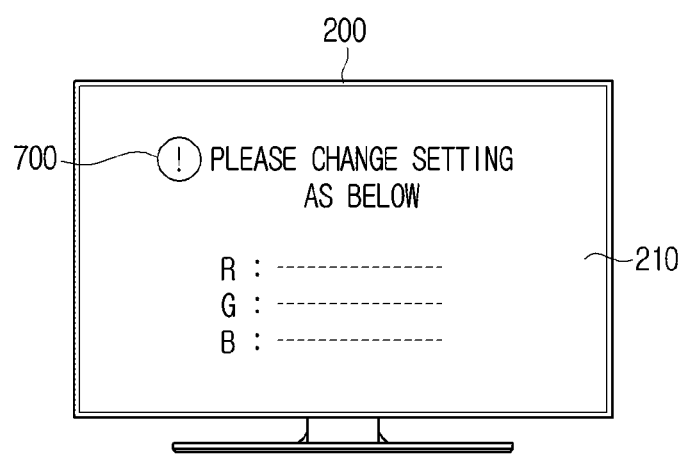
FIG. 7 is a diagram illustrating an example guide user interface (UI) including color adjustment information according to various embodiments.

FIG. 7 is a diagram illustrating an example guide user interface (UI) including color adjustment information according to various embodiments.

The second electronic apparatus 200 may provide a guide UI 700, through the display 210, that includes recommended color adjustment information for adjusting the color of the NFT image based on the obtained color calibration information. For example, if the software mounted on the second electronic apparatus 200 does not support NFT image color adjustment based on color calibration information, the processor 230 may provide UI 700 that guides the user to change the settings of the apparatus 200 instead of directly changing the settings of the apparatus 200.

The guide UI 700 may include, but is not limited to, information about adjusting a gain value that increases or decreases the respective components of the reference colors (e.g., R, G, B) of the colors of the image displayed through the display 210 of the second display apparatus 200.

When the user changes the setting of the apparatus 200 through the guide UI 700, the second electronic apparatus 200 may display the NFT image having the adjusted color through the display 210 based on the changed setting.

Figure 8:
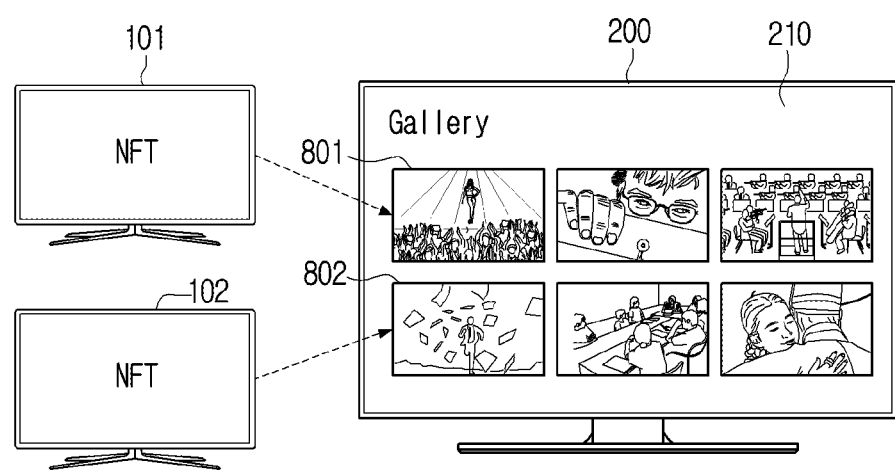
FIG. 8 is a diagram illustrating example individual color adjustment for a plurality of NFT images according to various embodiments.

FIG. 8 is a diagram illustrating example individual color adjustment for a plurality of NFT images according to various embodiments.

The second electronic apparatus 200 may display a UI screen including a plurality of NFT images 801, 802, etc. through the display 210. The plurality of NFTs may be an NFT generated from at least one external device, and, according to one example, the first NFT 801 may be an NFT generated from the first external device 101 and the second NFT 802 may be an NFT generated from a second external device 102, respectively.

The first NFT 801 includes setting information, spectrum information, CMF information, and color measurement data corresponding to the first external device 101 as attribute information, and the second NFT 802 may include setting information, spectrum information, CMF information, and color measurement data corresponding to the second external device 102 as attribute information.

The second electronic apparatus 200 may individually adjust the color of the plurality of NFT images 801, 802, etc. based on attribute information corresponding to each of the plurality of NFT images 801, 802, etc. For example, the second electronic apparatus 200 may adjust the color of the image corresponding to the first NFT 801 based on the attribute information of the first NFT 801 and adjust the color of the image corresponding to the second NFT 802 based on the attribute information of the second NFT 802.

As a result, the second electronic apparatus 200 may, for example, display a plurality of NFT images 801, 802, etc., which provide an aesthetic feeling intended by a manufacturer of each NFT in the process of manufacturing the NFT through a preview screen, even before the user of the device 200 purchases the NFT.

Figure 9:
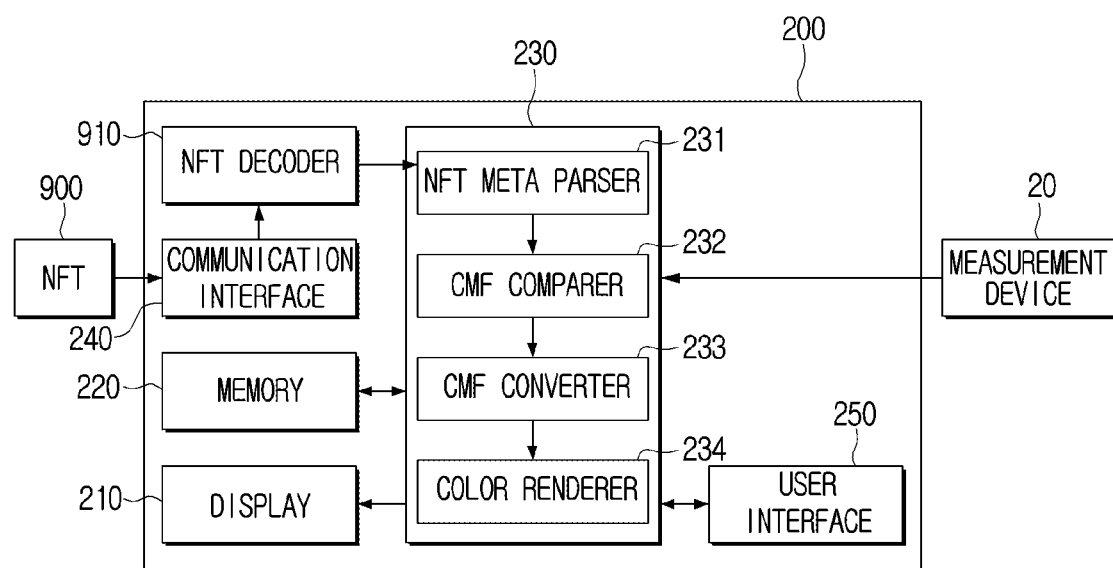
FIG. 9 is a block diagram illustrating a functional configuration of an example electronic apparatus of an NFT purchaser according to various embodiments.

FIG. 9 is a block diagram illustrating a functional configuration of an example electronic apparatus of an NFT purchaser according to various embodiments.

Referring to FIG. 9, the second electronic apparatus 200 may include an NFT decoder 910, a display 210, a memory 220, a processor 230, a communication interface 240, and a user interface 250. The processor 230 may include a plurality of modules 231 to 234, which are functional components, and the functions of each module may be implemented by the processor 230, e.g., using the information stored in the memory 220.

When the user purchases the NFT 900, the processor 230 may receive the selected NFT 900 from an NFT management server via the communication interface 240. NFT decoder 910 may perform a function of returning the encrypted information included in the received NFT 900 to a form before being encrypted.

The decoded data from the NFT decoder 910 may be analyzed by the NFT meta parser 231. For example, the NFT meta parser 231 may identify setting information, color measurement data, spectrum information, and CMF information corresponding to the external device used when the NFT 900 was manufactured based on the attribute information included in the NFT 900.

The CMF comparer 232 may determine necessity of CMF converting by comparing the recommended CMF information of the second electronic apparatus 200 and the CMF information used for color measurement of the second electronic apparatus 200, the recommended CMF information of the external device and the CMF information used for measurement of color of an external device. For example, even if the CMF used for color measurement of the second electronic apparatus 200 and the CMF used for color management of an external device is different, or even if the CMF used for color management of the second electronic apparatus 200 and the CMF used for color management of the external device is the same, the same CMF is different from the recommended CMF information of the second electronic apparatus 200 or the CMF identified as the reference CMF among the recommended CMF information of the external device, the CMF comparer 232 may identify that CMF converting is necessary. If it is identified that CMF converting is necessary, the CMF comparer 232 may identify any one of the first recommend CMF information for the second electronic apparatus 200 and the second recommended CMF information for the external device as reference CMF information.

When CMF converting is necessary, the CMF converter 233 may perform CMF converting based on spectrum information corresponding to each of the second electronic apparatus 200 and the external device, the first color measurement data of the second electronic apparatus 200, the second color management data of an external device, CMF information used for color measurement of the second electronic apparatus 200, CMF information used for color measurement of an external device, and reference CMF information.

For example, the CMF converter 233 may identify a color of the test image (e.g., R, G, B values) displayed through the second electronic apparatus 200 by reflecting the first spectrum information of the second electronic apparatus 200 to the first color measurement data and the first measurement CMF information used for color measurement, predict a color that is assumed to be provided through the second electronic apparatus 200, and then may obtain first color calibration information (e.g., matrix data) for converting the first measurement CMF information into reference CMF information based on the identified color and the predicted color value.

The CMF converter 233 may identify the color of the test image displayed through the external device by reflecting the second spectrum information of the external device and the second measurement CMF information used for the color measurement of the external device, predict a color that is assumed to be provided through the external device according to the reference CMF based on the reference CMF information and the second spectrum information, and then may obtain second color calibration information for converting the second measurement CMF information into reference CMF information based on the identified color and the predicted color value.

The color renderer 234 may adjust the color of the NFT 900 image based on the CMF converting result. For example, the color renderer 234 may obtain first color information assumed when the first color measurement data is provided through the second electronic apparatus 200 according to the reference CMF information based on the first color calibration information and the first color measurement data.

The color renderer 234 may obtain second color information assumed when the second color measurement data is provided through the external device according to the reference CMF information based on the second color calibration information and the second color measurement data. The color renderer 234 may compare the first color information and the second color information to adjust the color of the NFT 900 image.

Figure 10:
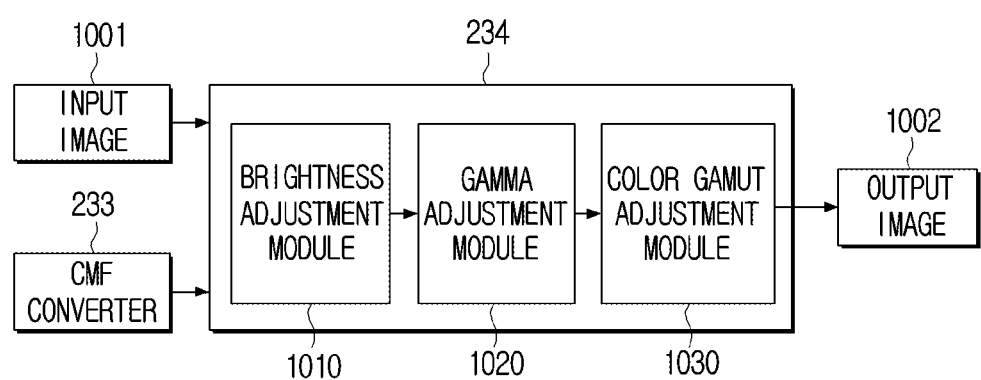
FIG. 10 is a diagram illustrating an example color adjustment process of an NFT image according to various embodiments.

FIG. 10 is a diagram illustrating an example color adjustment process of an NFT image according to various embodiments.

The color renderer 234 may obtain the output image 1002 based on the color calibration information obtained through the input image 1001 and the CMF converter 233. The color renderer 234 may include a brightness adjustment module 1010, a gamma adjustment module 1020, and a color gamut adjustment module 1030.

The brightness adjustment module 1010 may compare the first color information and the second color information and adjust the brightness of the NFT image based on the comparison result. For example, if the color according to the first color information is darker than the color according to the second color information, the brightness adjustment module 1010 may control the display 210 to increase the brightness of the NFT image.

The gamma adjustment module 1020 may adjust the gamma value of the second electronic apparatus 200 to change the relationship between the output luminance for the gray level of the input image. According to one example, the adjustment range of the gamma value may have a value between 1.0 and 3.0, but the disclosure is not limited in this respect.

The color gamut adjustment module 1030 may obtain at least one gain to be applied to the R, G, and B values for the input image according to the result of comparing the first color information and the second color information in the gamut of the second electronic apparatus 200 with the same changed setting as the external device. When the obtained gain value is applied to the input image, the color-adjusted output image 1002 is obtained, and, when the output image 1002 is displayed through the second electronic apparatus 200, the same aesthetic feeling as a case in which the input image 1001 is displayed through an external device may be provided.

Figure 11:
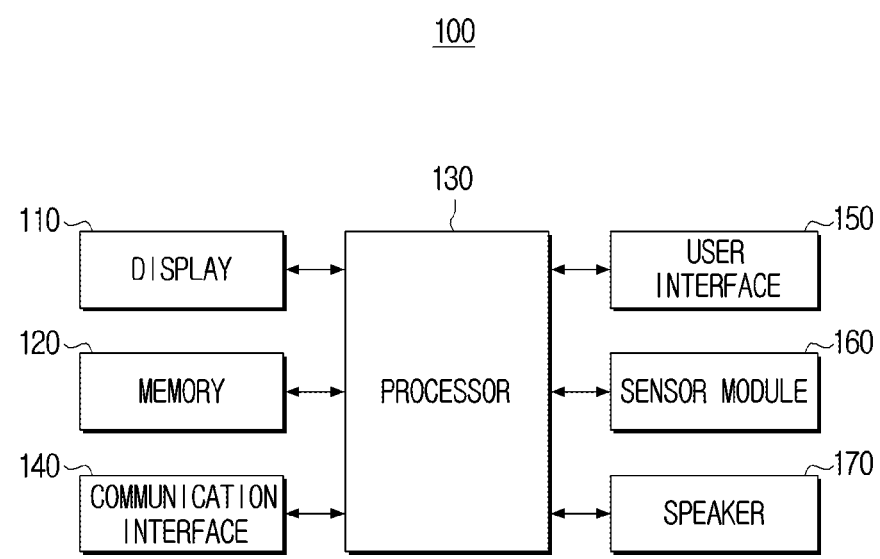
FIG. 11 is a block diagram specifically illustrating a configuration of an example electronic apparatus of an NFT manufacturer according to various embodiments.

FIG. 11 is a block diagram specifically illustrating a configuration of an example electronic apparatus of an NFT manufacturer according to various embodiments.

Referring to FIG. 11, the first electronic apparatus 100 may include the display 110, the memory 120, the processor 130, the communication interface 140, the user interface 150, the sensor module 160, and the speaker 170. In the configuration shown in FIG. 11, a detailed description of the overlapping configuration with FIG. 2 will not be repeated.

The communication interface 140 (e.g., including communication circuitry) may input and output various types of data. For example, the communication interface 140 may receive and transmit various types of data with an eternal device (e.g., source device), external storage medium (e.g., USB memory), external server (e.g., web hard) through communication methods such as an access point (AP)-based wireless fidelity (Wi-Fi) (wireless local area network (WLAN)), Bluetooth™, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The processor 130 may control the communication interface 140 to transmit an NFT to an NFT management server when an NFT including attribute information is generated, and when a user command of uploading the NFT to the NFT management server is input.

The user interface 150 is configured to be involved in performing interaction with the user by the first electronic apparatus 100. For example, the user interface 150 may include at least one of a touch sensor, a motion sensor, a button, a jog dial, a switch, or a microphone, but is not limited thereto. When the user input relating to NFT generation and upload of the generated NFT, or the like, is received through the user interface 150, the processor 130 may perform an operation corresponding to the received user command.

The sensor module 160 is configured to obtain sensing data for obtaining surrounding environment information of the first electronic apparatus 100. The sensor module 160 may include at least one of a time of flight (ToF) sensor, an infrared sensor, a microphone, a color sensor (e.g., Red, Green, Blue (RGB)) sensor, an illuminance sensor, a tilt sensor, a gesture sensor, an atmospheric pressure sensor, a magnetic sensor, a grip sensor, a proximity sensor, a biometric sensor, an on/humidity sensor, or an ultra violet sensor.

The processor 130 may combine the surrounding environment information obtained through the sensor module 160 with the attribute information of the NFT to generate the NFT. Alternatively, the processor 130 may change the setting information of the first electronic apparatus 100 based on the surrounding environment information, and reflect the changed current setting information as attribute information of the NFT.

The speaker 170 is a device to convert an electrical sound signal generated by the processor 130 corresponding to audio provided by the first electronic apparatus 100 into a sound wave. The speaker 170 may include a permanent magnet, a coil, and a vibration plate, and may output sound by vibrating the vibration plate by electromagnetic interaction between the permanent magnet and the coil. For example, the processor 130 may control the speaker 170 to output audio related to an image provided through the display 110.

Figure 12:
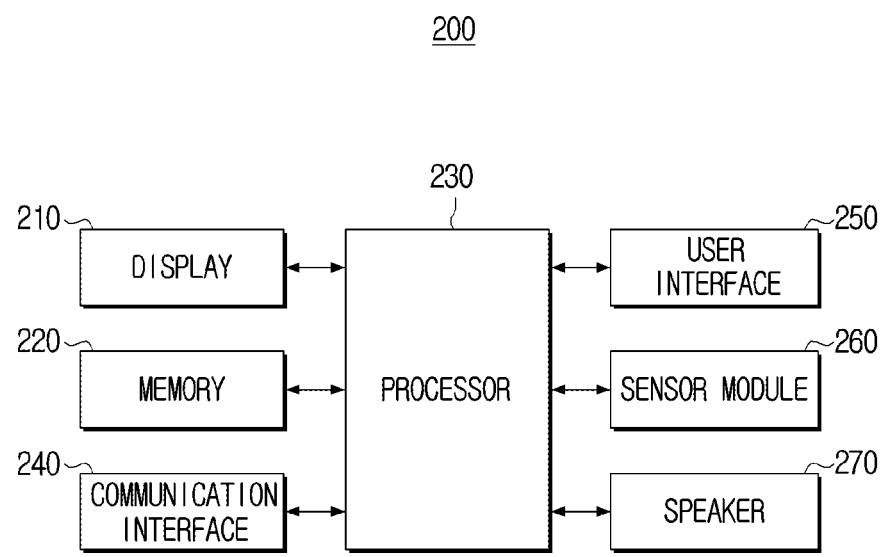
FIG. 12 is a block diagram specifically illustrating a configuration of an example electronic apparatus of an NFT purchaser according to various embodiments.

FIG. 12 is a block diagram specifically illustrating a configuration of an example electronic apparatus of an NFT purchaser according to various embodiments.

Referring to FIG. 12, the second electronic apparatus 200 may include a display 210, a memory 220, a processor 230, a communication interface 240, a user interface 250, a sensor module 260, and a speaker 270. In the configuration shown in FIG. 12, a detailed description of the overlapping configuration with FIG. 3 will not be repeated.

The communication interface 240 may input and output various types of data. For example, the communication interface 240 (e.g., including communication circuitry) may receive and transmit various types of data with an eternal device (e.g., source device), external storage medium (e.g., USB memory), external server (e.g., web hard) through communication methods such as an access point (AP)-based wireless fidelity (Wi-Fi) (wireless local area network (WLAN)), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The processor 230 may control the communication interface 240 to receive a selected NFT from an NFT management server when a user command of purchasing the NFT is input.

The user interface 280 is configured to be involved in performing interaction with the user by the second electronic apparatus 200. For example, the user interface 280 may include at least one of a touch sensor, a motion sensor, a button, a jog dial, a switch, or a microphone, but is not limited thereto. When the user input relating to NFT purchasing, or the like, is received through the user interface 250, the processor 230 may perform an operation corresponding to the received user command.

The sensor module 260 obtains sensing data for obtaining surrounding environment information of the second electronic apparatus 200. The sensor module 260 may include at least one of a time division of flight (TOF) sensor, an infrared sensor, a microphone, a color sensor (e.g., Red, Green, Blue (RGB)) sensor, an illuminance sensor, a tilt sensor, a gesture sensor, an atmospheric pressure sensor, a magnetic sensor, a grip sensor, a proximity sensor, a biometric sensor, an on/humidity sensor, or an ultra violet sensor, but is not limited thereto.

The processor 230 may change the setting of the second electronic apparatus 200 based on the surrounding environment information obtained through the sensor module 260. For example, the processor 230 may change the setting of the second electronic apparatus 200 based on setting information of an external device included in NFT attribute information, surrounding environment information of the external device, and surrounding environment information of the second electronic apparatus 200. The processor 230 may change the setting of the second electronic apparatus 200 in consideration of the difference in the surrounding environment corresponding to each of the external device and the second electronic apparatus 200.

The speaker 270 is a device to convert an electrical sound signal generated by the processor 230 corresponding to an audio provided by the second electronic apparatus 200 into a sound wave. The speaker 270 may include a permanent magnet, a coil, and a vibration plate, and may output sound by vibrating the vibration plate by electromagnetic interaction between the permanent magnet and the coil. For example, the processor 230 may control the speaker 270 to output audio related to an image provided through the display 210.

Figure 13:
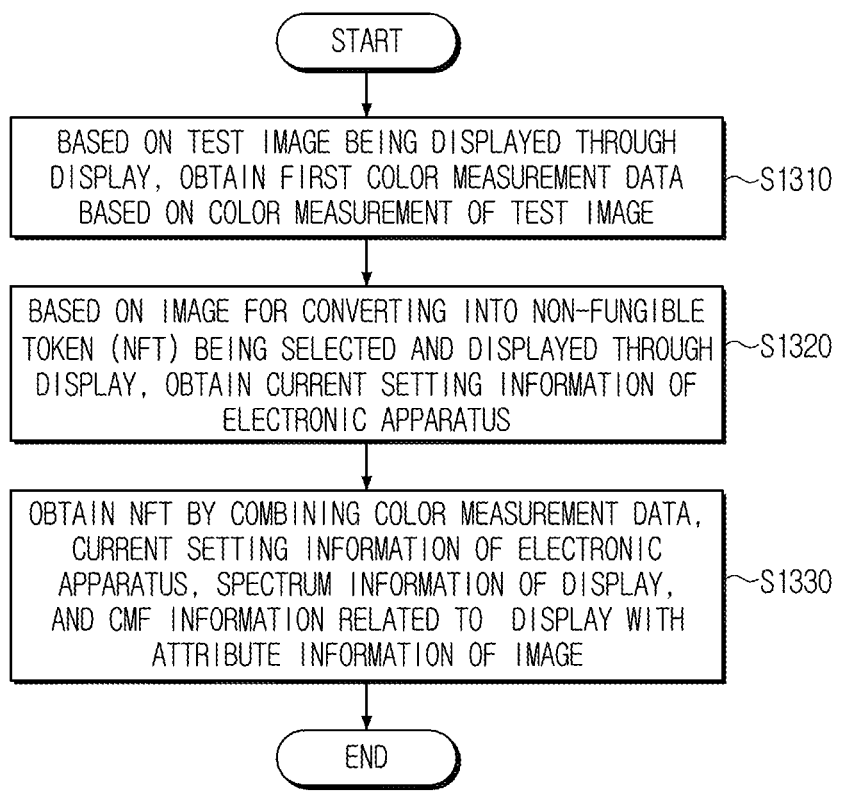
FIG. 13 is a flowchart illustrating a method of controlling an example electronic apparatus of an NFT manufacturer according to various embodiments.

FIG. 13 is a flowchart illustrating a method of controlling an example electronic apparatus of an NFT manufacturer according to various embodiments.

A method of controlling the first electronic apparatus includes, based on a test image being displayed through the display, obtaining first color measurement data based on a color measurement of the test image in operation S1310.

The method may include, based on an image for converting into a non-fungible token (NFT) being selected and displayed through the display, obtaining current setting information of the electronic apparatus in operation S1320.

The method may include obtaining an NFT by combining the color measurement data, current setting information of the electronic apparatus, spectrum information of the display, and CMF information related to the display with attribute information of the image in operation S1330.

In an embodiment, the setting information of the electronic apparatus may include at least one of gamut information, brightness information, or gamma information.

In an embodiment, the CMF information related to the display may include at least one of recommended CMF information corresponding to the display or CMF information used for obtaining the color measurement data.

The obtaining color measurement data in operation S1310 may include providing a guide user interface for guiding a measurement environment related to color measurement of the test image through the display.

Figure 14:
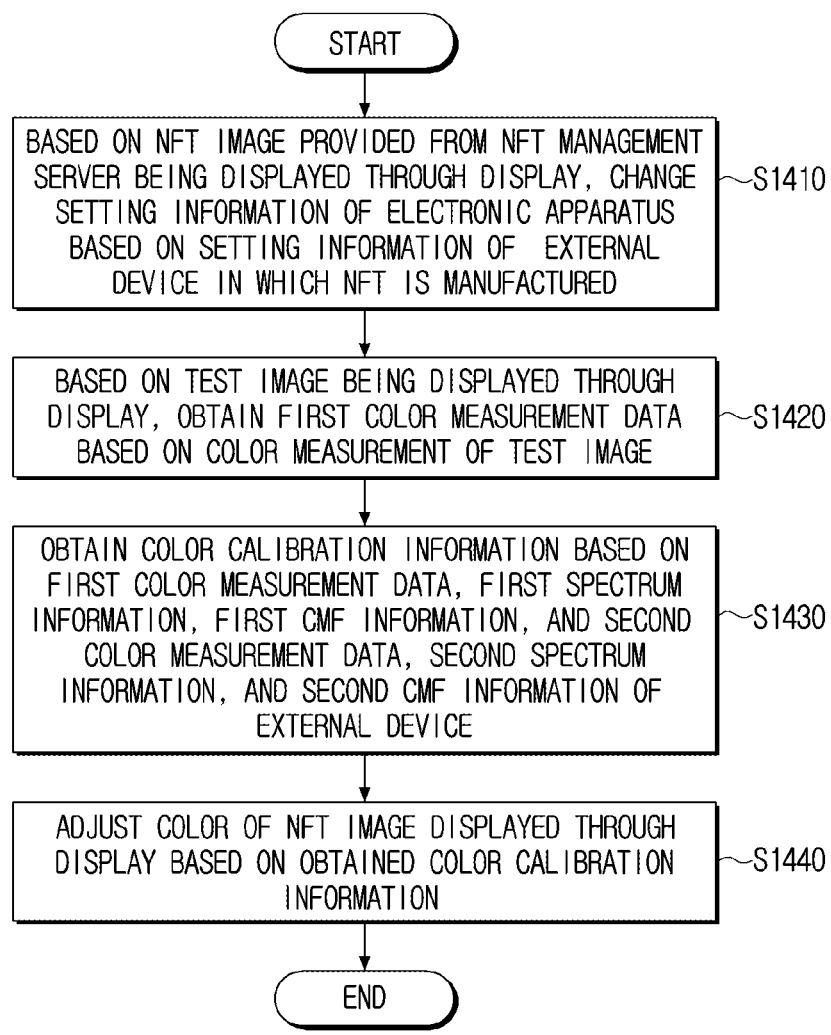
FIG. 14 is a flowchart illustrating a method of controlling an example electronic apparatus of an NFT purchaser according to various embodiments.

FIG. 14 is a flowchart illustrating a method of controlling an example electronic apparatus of an NFT purchaser according to various embodiments.

A method of controlling the second electronic apparatus includes, based on an NFT image provided from the NFT management server being displayed through the display, changing the setting information of the electronic apparatus based on the setting information of an external device in which the NFT is manufactured in operation S1410.

The method may include, based on a test image being displayed through the display, obtaining first color measurement data based on a color measurement of the test image in operation S1420.

The method may include obtaining color calibration information based on first color measurement data, first spectrum information, first CMF information, and second color measurement data, second spectrum information, and second CMF information of the external device in operation S1430.

The method may include adjusting a color of the NFT image displayed through the display based on the obtained color calibration information in operation S1440.

In an embodiment, the first CMF information may include recommended CMF information of the electronic apparatus, and the adjusting color of the NFT image in operation S1440 may include, based on the first spectrum information, obtaining first color information in which the first color measurement data is provided according to the first CMF information; based on the second spectrum information, obtaining second color information in which the second color measurement data is provided according to the first CMF information; and adjusting color of the NFT image by comparing the first color information and the second color information.

In an embodiment, the first CMF information may include first recommended CMF information and first measurement CMF information used in obtaining the first color measurement data, and the second CMF information may include second recommended CMF information and second measurement CMF information used in obtaining the second color measurement data, the obtaining the color calibration information may include identifying one of the first recommended CMF information and the second recommended CMF information as reference CMF information; obtaining first color calibration information based on the first color measurement data, the first spectrum information, the reference CMF information, and the first measurement CMF information; and obtaining second color calibration information based on the second color measurement data, the second spectrum information, the reference CMF information, and the second measurement CMF information. The adjusting color of the NFT image in operation S1440 may include obtaining the first color information based on the first color calibration information and the first color measurement data; obtaining the second color information based on the second color calibration information and the second color measurement data; and adjusting color of the NFT image by comparing the first color information and the second color information.

In an embodiment, the adjusting color of the NFT image in operation S1440 may include displaying a UI screen comprising a plurality of NFT images through the display; and individually adjusting color of the plurality of NFT images based on attribute information corresponding to each of the plurality of NFT images.

In an embodiment, the adjusting color of the NFT image in operation S1440 may include providing a guide UI comprising recommended color adjustment information to adjust color of the NFT image based on the obtained color calibration information.

In an embodiment, the controlling method may further include adjusting the brightness of the NFT image by comparing the first color information and the second color information.

The methods according to the various embodiments of the disclosure may be implemented as a type of an application installable in an existing display apparatus.

In addition, the methods according to various embodiments may be implemented with software upgrade(s) or hardware upgrade(s) for a conventional display apparatus.

The various embodiments may be performed through an embedded server provided in the display apparatus or at least one external server.

The various embodiments described above may be implemented in a recordable medium which is readable by a computer or a device similar to the computer using software, hardware, or a combination of software and hardware. In some cases, embodiments described herein may be implemented by the processors 130, 230 of the electronic apparatuses 100, 200. According to a software implementation, embodiments such as the procedures and functions described herein may be implemented with separate software modules. Each of the software modules may perform one or more of the functions and operations described herein.

According to various embodiments described above, computer instructions for performing processing operations of the electronic apparatuses 100, 200 according to the various embodiments described above may be stored in a non-transitory computer-readable medium. The computer instructions stored in the non-transitory computer-readable medium may cause a particular device to perform processing operations on the electronic apparatuses 100, 200 according to the various embodiments described above, when executed by the processor of the particular device.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While embodiments of the disclosure have been shown and described, the disclosure is not limited to the aforementioned specific embodiments, and it is apparent that various modifications can be made by those having ordinary skill in the technical field to which the disclosure belongs, without departing from the scope of the disclosure as claimed by the appended claims. Also, it is intended that such modifications are not to be interpreted independently from the technical idea or prospect of the disclosure.

What is claimed is:

1. An electronic apparatus comprising:
a display comprising a display panel;
memory configured to store spectrum information dependent on characteristics of the display panel and color matching function (CMF) information related to the display; and
at least one processor,
wherein the memory stores instructions which, when executed, configure the at least one processor to individually or collectively control the electronic apparatus to:
obtain color measurement data based on color measurement of a test image displayed on the display,
obtain current setting information of the electronic apparatus including gamut information, brightness information, and gamma information when an image for converting into a non-fungible token (NFT) is selected and displayed on the display, and
generate an NFT by combining the color measurement data, the current setting information of the electronic apparatus, the spectrum information dependent on the characteristics of the display panel, and the CMF information related to the display with attribute information of the image.

2. The electronic apparatus of claim 1, wherein the CMF information related to the display comprises at least one of recommended CMF information corresponding to the display or CMF information used for obtaining the color measurement data.

3. The electronic apparatus of claim 1, wherein the instructions configure the at least one processor to individually or collectively control the electronic apparatus to provide a guide user interface for guiding a measurement environment related to color measurement of the test image through the display.

4. An electronic apparatus comprising:
a display;
memory configured to store first spectrum information of the display and first color matching function (CMF) information related to the display; and
at least one processor,
wherein the memory stores instructions which, when executed, configure the at least one processor to individually or collectively control the electronic apparatus to:
change setting information of the electronic apparatus based on setting information of an external device in which an NFT is manufactured when an NFT image provided from an NFT management server is displayed on the display, the setting information of the external device including gamut information, brightness information, and gamma information,
obtain first color measurement data based on a color measurement of a test image when the test image is displayed on the display,
obtain color calibration information based on the first color measurement data, the first spectrum information, the first CMF information, and second color measurement data, second spectrum information, and second CMF information of the external device, and
adjust a color of the NFT image displayed on the display based on the obtained color calibration information.

5. The electronic apparatus of claim 4, wherein the first CMF information comprises recommended CMF information of the electronic apparatus, and
wherein the instructions, when executed, configure the at least one processor to individually or collectively control the electronic apparatus to:
based on the first spectrum information, obtain first color information in which the first color measurement data is provided according to the first CMF information,
based on the second spectrum information, obtain second color information in which the second color measurement data is provided according to the first CMF information, and
adjust color of the NFT image by comparing the first color information and the second color information.

6. The electronic apparatus of claim 5, wherein:
the first CMF information comprises first recommended CMF information and first measurement CMF information used in obtaining the first color measurement data, and
the second CMF information comprises second recommended CMF information and second measurement CMF information used in obtaining the second color measurement data, and
wherein the instructions configure the at least one processor to individually or collectively control the electronic apparatus to:
identify one of the first recommended CMF information or the second recommended CMF information as reference CMF information,
obtain first color calibration information based on the first color measurement data, the first spectrum information, the reference CMF information, and the first measurement CMF information,
obtain the first color information based on the first color calibration information and the first color measurement data,
obtain second color calibration information based on the second color measurement data, the second spectrum information, the reference CMF information, and the second measurement CMF information,
obtain the second color information based on the second color calibration information and the second color measurement data, and
adjust color of the NFT image by comparing the first color information and the second color information.

7. The electronic apparatus of claim 5, wherein the instructions, when executed, configure the at least one processor to individually or collectively control the electronic apparatus to adjust brightness of the NFT image by comparing the first color information and the second color information.

8. The electronic apparatus of claim 4, wherein the instructions, when executed, configure the at least one processor to individually or collectively control the electronic apparatus to:
display a user interface (UI) screen comprising a plurality of NFT images through the display, and
individually adjust color of the plurality of NFT images based on attribute information corresponding to each of the plurality of NFT images.

9. The electronic apparatus of claim 4, wherein the instructions, when executed, configure the at least one processor to individually or collectively control the electronic apparatus to display a guide UI, through the display, comprising recommended color adjustment information to adjust color of the NFT image based on the obtained color calibration information.

10. A method of controlling an electronic apparatus, the method comprising:
   changing setting information of the electronic apparatus based on the setting information of an external device in which an NFT is manufactured when an NFT image provided from an NFT management server is displayed on a display, comprising a display panel, the setting information of the external device including gamut information, brightness information, and gamma information;
   obtaining first color measurement data based on a color measurement of a test image when the test image is displayed on the display;
   obtaining color calibration information based on the first color measurement data, first spectrum information dependent on characteristics of the display panel of the electronic apparatus, first CMF information, and second color measurement data, second spectrum information dependent on characteristics of a display panel of the external device, and second CMF information of the external device; and
   adjusting a color of the NFT image displayed on the display based on the obtained color calibration information.

11. The method of claim 10, wherein the first CMF information comprises recommended CMF information of the electronic apparatus,
   wherein the adjusting color of the NFT image comprises:
   based on the first spectrum information, obtaining first color information in which the first color measurement data is provided according to the first CMF information;
   based on the second spectrum information, obtaining second color information in which the second color measurement data is provided according to the first CMF information; and
   adjusting color of the NFT image by comparing the first color information and the second color information.

12. The method of claim 11, wherein:
   the first CMF information comprises first recommended CMF information and first measurement CMF information used in obtaining the first color measurement data, and
   the second CMF information comprises second recommended CMF information and second measurement CMF information used in obtaining the second color measurement data,
   wherein the obtaining the color calibration information comprises:
      identifying one of the first recommended CMF information or the second recommended CMF information as reference CMF information;
      obtaining first color calibration information based on the first color measurement data, the first spectrum information, the reference CMF information, and the first measurement CMF information; and
      obtaining second color calibration information based on the second color measurement data, the second spectrum information, the reference CMF information, and the second measurement CMF information,
   and wherein the adjusting color of the NFT image comprises:
      obtaining the first color information based on the first color calibration information and the first color measurement data;
      obtaining the second color information based on the second color calibration information and the second color measurement data; and
      adjusting color of the NFT image by comparing the first color information and the second color information.

13. The method of claim 10, wherein the adjusting color of the NFT image comprises:
   displaying a UI screen comprising a plurality of NFT images through the display; and
   individually adjusting color of the plurality of NFT images based on attribute information corresponding to each of the plurality of NFT images.

14. The method of claim 10, wherein the adjusting color of the NFT image comprises:
   providing a guide UI comprising recommended color adjustment information to adjust color of the NFT image based on the obtained color calibration information.

* * * * *